US005170880A

United States Patent [19]

Low

[11] Patent Number: 5,170,880

[45] Date of Patent: Dec. 15, 1992

[54] SOFT DROP SINGULATING DEVICE

[75] Inventor: John A. Low, Maurertown, Va.

[73] Assignee: Agri-Tech, Incorporated, Woodstock, Va.

[21] Appl. No.: 686,336

[22] Filed: Apr. 17, 1991

[51] Int. Cl.[5] .............................................. B65G 15/14

[52] U.S. Cl. ................................ 198/626.5; 198/817; 198/803.14

[58] Field of Search .................. 198/418.1, 817, 626.1, 198/626.6, 604, 606, 607, 803.14, 626.5

[56] References Cited

U.S. PATENT DOCUMENTS

| | | | |
|---|---|---|---|
| 430,031 | 6/1890 | Jones . | |
| 1,182,005 | 5/1916 | Forbes . | |
| 1,352,780 | 9/1920 | Bird . | |
| 1,552,366 | 9/1925 | Wade et al. . | |
| 2,195,628 | 4/1940 | Marsden | 198/817 X |
| 3,017,013 | 1/1962 | Sheetz | 198/817 X |
| 3,260,348 | 7/1966 | Niederer et al. | 198/418.1 X |
| 3,316,688 | 5/1967 | Niederer et al. | 198/418.1 X |
| 3,369,644 | 2/1968 | Niederer | 198/418.1 X |
| 3,653,509 | 4/1972 | Goodman, Jr. et al. | 198/817 X |
| 4,091,930 | 5/1978 | Button et al. | 209/73 |
| 4,726,898 | 2/1988 | Mills et al. | 209/545 |

*Primary Examiner*—D. Glenn Dayoan
*Attorney, Agent, or Firm*—Foley & Lardner

[57] ABSTRACT

A system for sorting items such as fruit includes a movable transport belt for each serial stream. The transport belt has first and second portions that are spaced a distance apart for receiving and carrying items previously singulated into serial streams. The first and second portions of the transport belts gradually diverge to slowly lower the items onto movable carriers which are introduced directly below the diverging sections of the transport belt portions. As a result, the fruit experiences little vertical drop and need not be accelerated by the carrier cups. Fruit or other items being gradually released from the belts can be transported at the same speed as the carrier cups to avoid the bruising effect caused by the rear portions of the carrier cups striking the items as they are dropped in. In addition, the transport belt can be arranged to carry the items through a sorter section without guides. As a result, a larger portion of the item to be sorted can be exposed to a sorting device to more accurately complete the sorting process.

5 Claims, 4 Drawing Sheets

SOFT DROP SINGULATING DEVICE

BACKGROUND OF THE INVENTION

1. Field of the Invention

The invention deals with singulators which are used for sorting goods. Such singulators are used to arrange a plurality of objects into one or more streams of objects which are serially arranged so that they can be moved and individually examined for further sorting or other processing. In particular, the present singulator is useful in sorting applications where it is important to avoid damaging the items being sorted. One example is citrus fruit sorting.

2. Related Art

The use of singulators in fruit sorting applications is well known. U.S. Pat. No. 4,726,898 discloses a singulator conveyor which uses rollers rotatably mounted to a chain drive. The roller conveyors may be spaced along the chain to accommodate fruit of various sizes, so that each item of fruit is carried by an adjacent roller conveyor. U.S. Pat. No. 4,091,931 discloses an aligning conveyor 28 defined by a plurality of parallel, side-by-side belts 58 constructed of resilient material. The aligning conveyor 28 receives tomatoes from side belts 16 and 18 and arranges the tomatoes into a plurality of side-by-side rows of serially arranged tomatoes.

Whether using rollers or belts, in conventional singulators the items being sorted undergo an abrupt transition at the end of the singulator belt when they are transferred into carrying cups for further sorting or processing. In such conventional systems, at the end of the belt each item is abruptly dropped into an individual carrying cup which moves the item along in the system. The abrupt drop causes fragile items such as fruit to be bruised, scratched, or otherwise damaged. In addition, the linear speed of fruit or other items moving along the belt is typically slower than the forward speed of the carrier cups. The carrier cups move at a higher rate of speed in order to maintain synchronism between the cups and the fruit dropping off the belt. Since the carrier cups are moving at a higher rate of speed, when an item falls into a cup, it is accelerated from its current linear speed. Since the item is dropped over a finite distance, its linear speed in the direction of travel may approach zero as the item drops from the belt. As a result of the difference in the forward travelling speed of the fruit and cup, the rear portion of the cup strikes the fruit or other item after it drops into the cup, further increasing the risk of damage to the fruit or other item.

Conventional approaches to reducing the amount of bruising or other damage resulting from singulation and sorting involve the use of soft padding and other shock absorbing materials. Conventional approaches fail to eliminate the source of the problem by controlling the dropping of items into the cups.

SUMMARY OF THE INVENTION

In view of the above described limitations of the related art, it is an object of the invention to provide a singulation and sorting system which reduces the shock experienced by items dropping from a singulator belt into carrier cups.

It is another object of the invention to reduce the shock experienced by such items by reducing the drop distance through which singulated items must travel when dropped into the carrier cups.

It is still another object of the invention to provide a system in which the transport belt from which the items are dropped can be operated at the same speed as the carrier cups.

It is still a further object of the invention to gradually transition items from the transport belt into the carrier cups.

These and other objects of the invention are accomplished by a sorting system with a singulation section, a sorting section, and a transfer section. Items to be sorted are first singulated in the singulation section and transmitted to a transport belt. As items serially leave the singulation section, they are delivered to the transport belt. In each singulated row, the transport belt has two portions spaced apart by a distance which is fixed to accommodate the size of the item to be sorted. As the item passes through a sorting section, it can be sorted by weight, color, or some other parameter, as would be known to those of ordinary skill.

As the items leave the sorter and enter the transfer section, they remain on the transport belt. The spacing between the two portions of the transport belt gradually increases causing the item to be correspondingly gradually lowered toward the carrier cups. The length and rate of divergence of the belt sections is selected so that the sorted item is gradually lowered toward the carrier cup and released into the carrier cup at approximately the same forward travelling speed as the carrier cup itself. Since the item to be sorted is gradually lowered, the item does not experience the shock which is typical in conventional systems as a result of dropping. In addition, since the item is travelling at approximately the same speed as the carrier cup when it is released into the cup, it is less likely to be struck by the rear portion of the cup, thereby avoiding additional damage. As a result, sorted items experience less damage in the sorting process.

BRIEF DESCRIPTION OF THE DRAWINGS

The invention will be described with particular reference to the drawings in which.

DETAILED DESCRIPTION OF THE PREFERRED EMBODIMENTS

A sorter according to the invention has an apparatus for transferring items received from a singulator. The singulator organizes the items into at least one serial stream. The apparatus for transferring the items includes a moveable transport belt for each serial stream. The transport belt has first and second portions spaced a distance apart which receive and carry the items from the serial streams. The first and second portions of the transport belts gradually diverge to slowly lower the items into the moveable carriers in the transfer section. In the singulator section, an undulating shaped belt is situated between the first and second portions of each transport belt. The undulating shaped belt is arranged to have a wave shape with peaks and valleys. The peaks and valleys are sized so that each individual item to be sorted is placed in one valley between two peaks. The waved shaped or undulating belt is used to stabilize the items to be sorted on the transport belt, which has first and second portions on either side of the wave shaped belt. Thus, the wave shaped belt need only be sufficiently long as required to stabilize the particular items for sorting.

Figure 1:
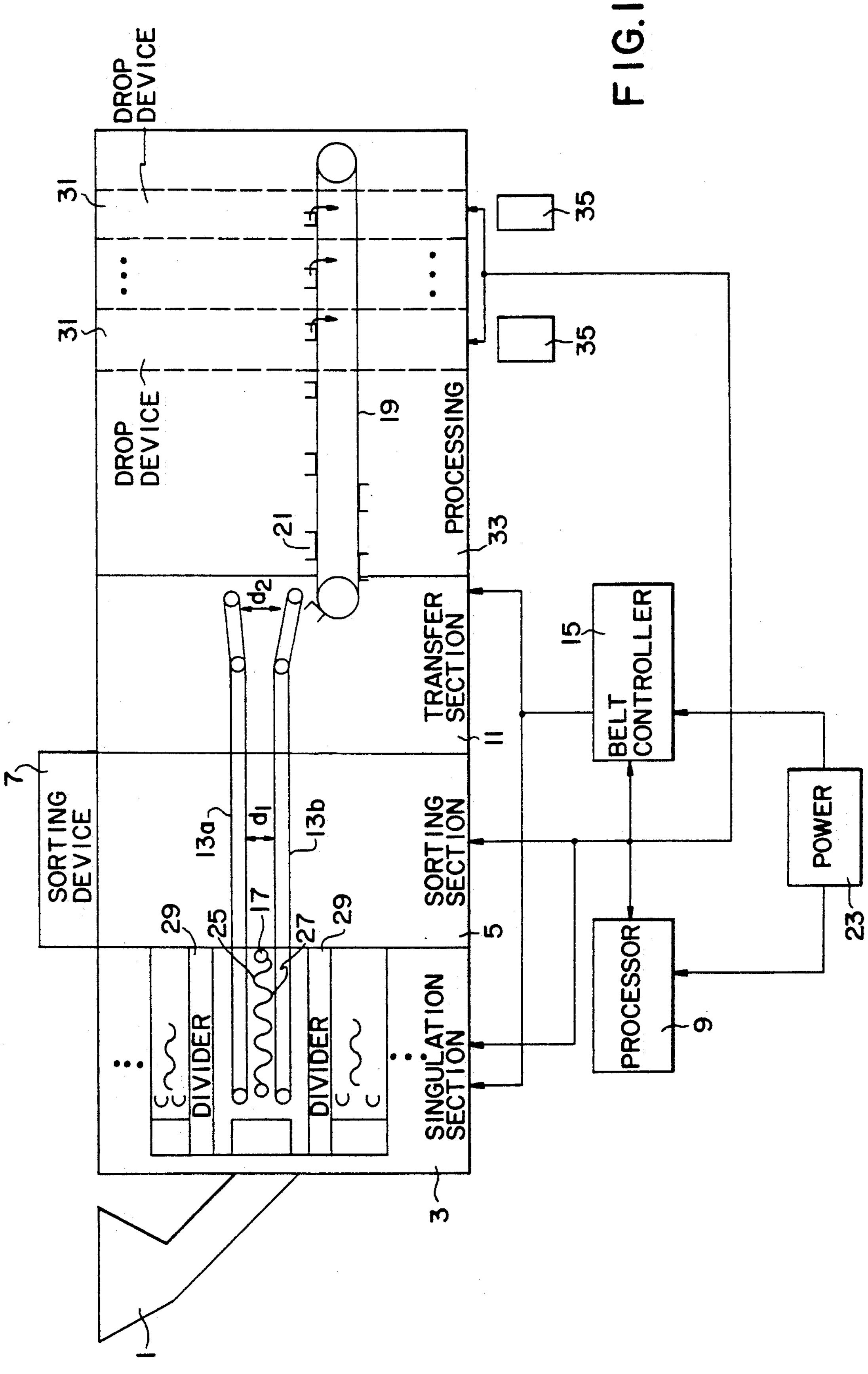
FIG. 1 shows the general division of the sections of the invention.

FIG. 1 is a schematic representation of a generalized system according to the invention. Hopper 1 receives items to be sorted and transfers the items to singulator section 3. Singulator section 3 routes items to sorter section 5 where sorting device 7 sorts the items according to a parameter, such as color, and provides the sorting information to processor 9. When the items leave sorter section 5, they enter transfer section 11. Transport belt 13 is routed through singulator section 3, sorter section 5, and transfer section.

Belt controller 15 controls the operation of transport belt 13, wave shaped belt 17, and carrier belt 19 which transports carrier cups 21. In one embodiment, the operation of the belts can be coordinated through processor 9 using known coordination and belt drive techniques. Power supply 23 provides power to the system. In the embodiment shown in FIGS. 2–4, belt control and synchronization functions are provided by a chain and sprocket system, as would be known to those of ordinary skill. In such systems, a drive source turns at least one sprocket. Chains, belts or other interconnection means, connected directly or through other chains and sprockets to the drive source, are used to communicate and coordinate operation of other parts of the system.

Singulator section 3 contains a known singulator 4 which provides a serial stream of items to be sorted to wave shaped belt 17. Known singulator 4 can include cups on a belt (not shown) driven by cup belt drive 6 mounted on sprocket 8 of drive wheel 43. Wave shaped belt 17 is located between first and second portions 13*a* and 13*b* of the transport belt 13. Wave shaped belt 17 has peaks 25 and valleys 27. The size of the peaks and valleys is selected so that each individual item received in the singulator section 3 is placed in one of the valleys 27. It should be noted that dividers 29 allow for a plurality of identical rows to be assembled so that singulation and sorting of multiple streams of serial items can take place simultaneously. For purposes of simplicity, only one row is illustrated in FIG. 1. However, it will be known to those of ordinary skill that any number of identical rows can be assembled for simultaneous singulation and sorting. A plurality of rows is shown in the top view of FIG. 3.

Sorting device 7, which operates in sorter section 5, can be any known or future developed sorting device which is used to categorize items by identifiable parameters. Examples of such sorting devices include color sorters, weight sorters, and size sorters. In one embodiment. the sorting device provides information to processor 9, which coordinates operation with one or more drop devices 31 in a known manner, so that items which have been transferred from transfer section 11 to carrier cups 21 in processing section 33 can be placed into the correct package 35 based on the sorting. In the embodiment illustrated in FIGS. 2–4, a chain and sprocket drive system is used to coordinate operation of the various elements in a manner as would be known to those of ordinary skill in the art.

As shown in transfer section the distance, d, between transport belts 13 gradually increases so that distance, $d_2$, is greater than distance, $d_1$. The gradual increase in the distance between the first portion 13*a* and second portion 13*b* of the transport belt 13 results in a gradual lowering of the items riding on the transport belt in the transfer section. As a result, when items depart from the transfer section and are placed into carrier cups 21 in the processing section, they need not be dropped over a long vertical distance, thereby reducing bruising or other damage.

Figure 2:
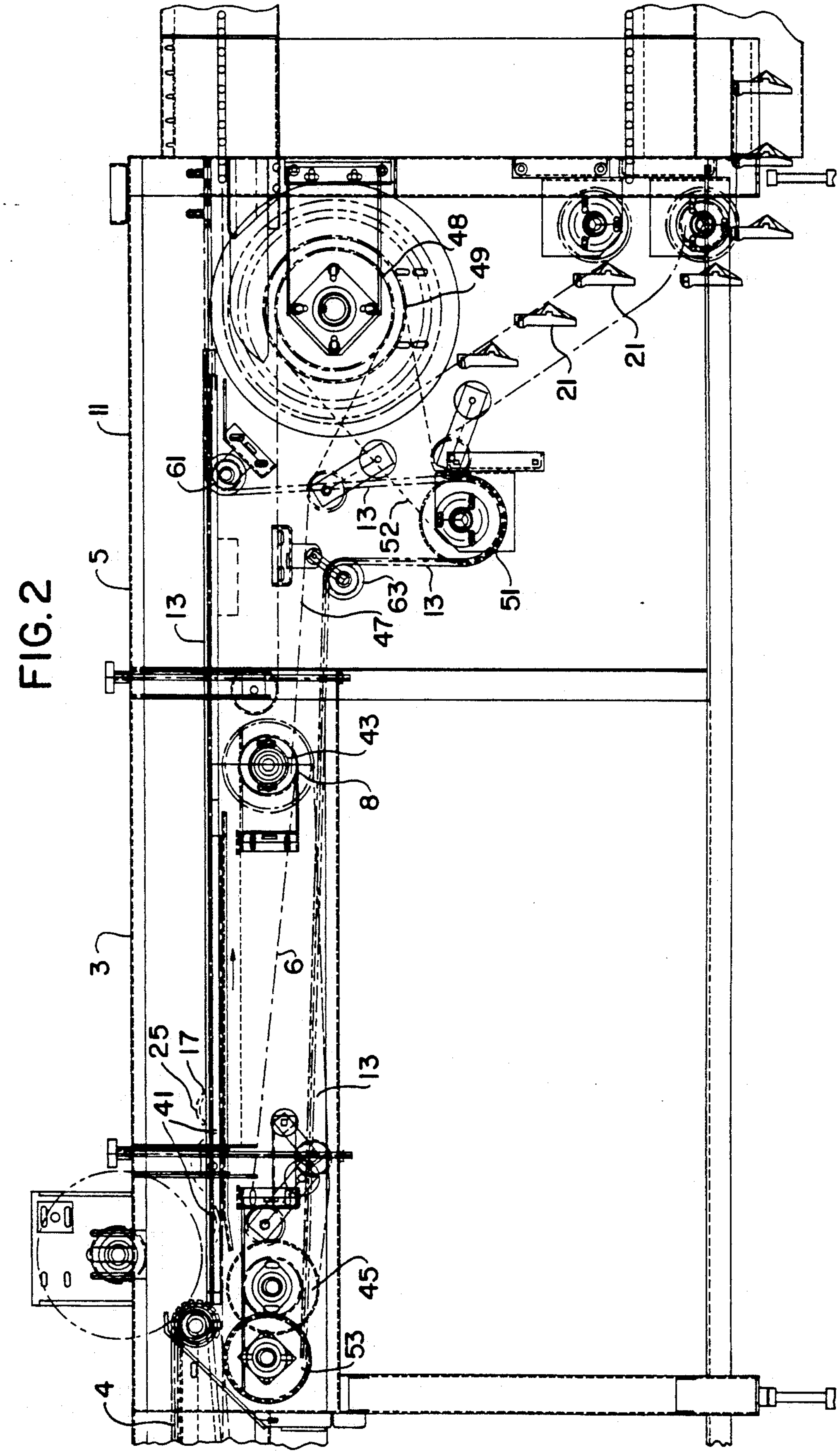
FIG. 2 shows a right side view of the singulator, sorter, and transfer sections of a system according to the invention.
Figure 3:
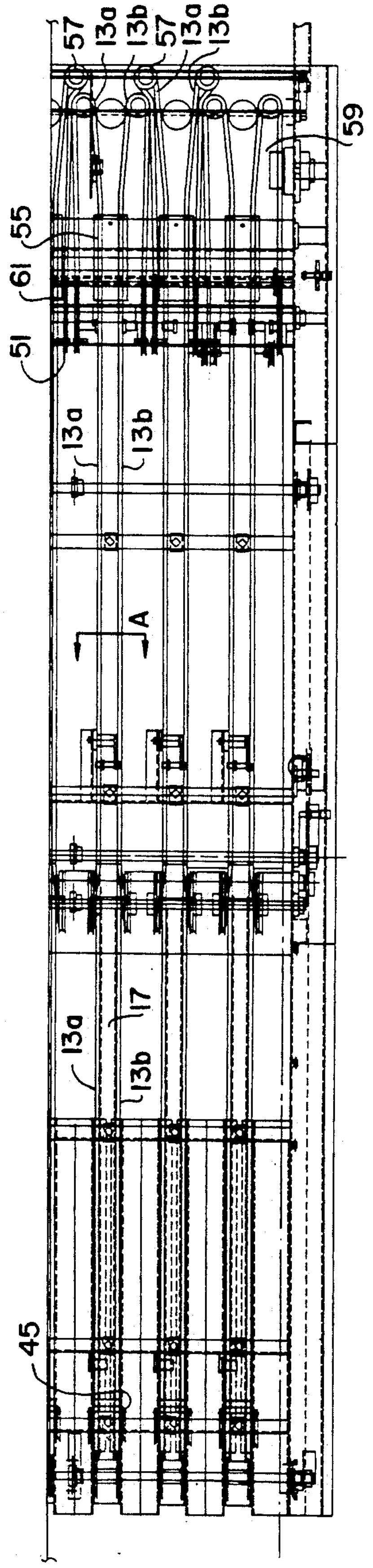
FIG. 3 shows a top view of the singulation, sorting, and transfer sections of the invention.
Figure 4:
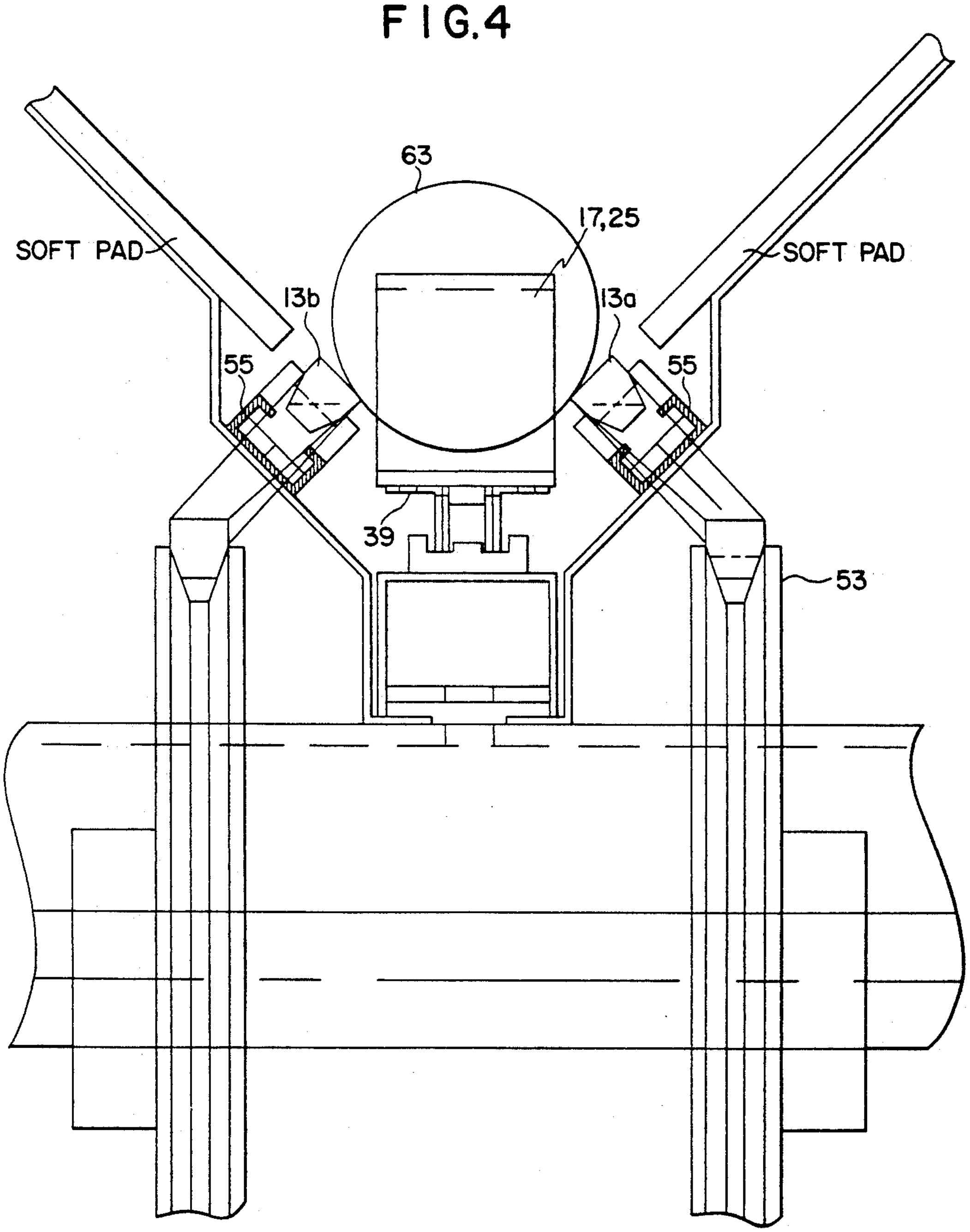
FIG. 4 shows a cross section taken through the intersection of the singulation and transfer sections of the system according to the invention.

FIGS. 2, 3 and 4 are more detailed views of the physical structure of the sorting apparatus. The right side view in FIG. 2 shows the singulator section 3 having a wave shaped belt or hump belt 17 which has a lower drive belt portion 39 physically attached at valleys 41 of the belt. The drive belt 39 could be, for example, a chain drive or other equivalent, as known to those of ordinary skill in the art. Chain drive 39 and flexible wave shaped belt 17 rotate on drive wheel 43 and idle wheel 45. Drive wheel 43 is connected via hump belt drive 47 to sprocket 48. It should be noted that those of ordinary skill in the art would recognize that the belts can be operated together from a single drive source, as in a conventional interconnected chain and sprocket drive system, or can be directly driven using other known drive and synchronizing means.

Transport belt 13 is routed around transport belt drive pulley 51 and pulley 53 so that the transport belt 13 forms a continuous loop through the singulator section 3 and sorter section 5. Sprocket 49 is connected via drive chain 52 to transport belt drive pulley 51. As shown in FIG. 3, the transport belt 13 is arranged so that portions of the transport belt 13*a* and 13*b* are located on either side of the wave shaped hump belt 25. Portions 13*a* and 13*b* can be formed of separate endless belts rotated on sprockets around either side of wave shaped hump belt 17. One example of such a belt is a Twistlink TM manufactured by Manheim Manufacturing and Belting Company of 311 West Steigel Street, Manheim, Pa. 17545. It will be clear that other belts may also be substituted. Individual pieces of fruit are transferred into the valleys 41 of flexible wave shape belt 17 and transported within valleys 41 for a distance required to stabilize the fruit. It should be noted that typically, the fruit is transferred into the valleys 41 from singulator cups (not shown) in singulator 4, which have already been used to sort the items into a serial stream of individual pieces. The purpose of the flexible wave shaped belt 17 is to stabilize items delivered individually from the serial stream before they are transferred to the transport belt 13 for further transport into the sorter and transfer sections. The transport belt is arranged at a slight angle on either side of wave shaped flexible belt 17.

Since the wave shaped belt 17 is used only for purposes of stabilizing the serial items, the wave shaped belt section need only be long enough to accomplish such stabilization. This length in the X direction may be different for different items, depending on their shape and size. At the remote end of singulator section 3 adjacent sorter section 5, the items are transported into sorter section 5 by the transport belt 13 alone. The transport belt 13 may ride in metal guides in the singulation section 3. However, in the sorter section 5, the metal guides are eliminated to expose as much of the item as possible to a sorting device located in sorter section 5. This could be helpful in sorting, for example, fruit by exposing to a color or size sorter a larger portion of the item to be viewed for sorting. In the sorting section, a sorting device may also record and transmit information to the processor 9 so that further downline appropriate drops are activated to package the items as desired. Other known means of activating the drops in response to the sorting parameters can also be employed.

In transfer section 11, the travel of the transport belt 13 may again be assisted by guides 55. As shown in FIG. 3, the guide ends prior to the divergence of the belt portions 13*a* and 13*b*. Idle pulleys 57 are used to set the divergence of belt portions 13*a* and 13*b*. As the top view in FIG. 3 shows, the belts diverge gradually after they exit the end of guides 55. It should be noted that at this point the belts also begin twisting. This is to facilitate belt turn around at idle pulleys 57. The top view in FIG. 3 also shows that the idle pulleys 57 are arranged in a staggered configuration. This allows a wider opening at the end of the transfer section to handle wider items such as fruit. As a result of the wider opening, fruit is not required to drop off the end of the transfer section into cups 21. The right side view in FIG. 2 more clearly illustrates that belt 13 travels over the cups 21. As the belt portions diverge, fruit is lowered gradually between belt portions 13*a* and 13*b* into one of the cups 21. The fruit or other items are then transported separately in individual cups 21 to the processing section where appropriate drop devices are activated for collecting the items according to the sorting parameters desired. Carrier cup shaft 59, shown in FIG. 3, further illustrates the positioning of the belts over the carrier cups. FIGS. 2 and 3 also show transport belt return pulley 61. On return from idle pulleys 57 back toward the sorter area, transport belt 13 is routed vertically downward on wheel 61 to transport belt drive pulley 51, thus completing a complete loop through the singulation sorter and transfer sections. Pulley 63 provides tension.

FIG. 4 is a cross sectional view of a typical singulator row according to the section A. Chain drive 39 is located at the lower portion of wave shaped belt 17. An item to be sorted such as a piece of fruit 63 is shown in the section. Guide channels 55 are shown on either side of the row near the lower portion of the row. Belt portions 13*a* and 13*b* are shown travelling within the guide channels 55. The belt is shown in two orientations. In the first orientation the belt appears vertical as the belt exits pulleys 53 and is about to enter guide channels 55. In the second orientation the belt rides in the guide channels and carries fruit and travels in the X direction toward the transfer section. In this case, the belt is at an angle to the horizontal so that it contacts the fruit. The belt is later turned into a third orientation (not shown), which is 90 degrees from the first orientation as it comes out of the guide channel 55 and around idle pulley 57 to make its return.

As a result of the configuration provided by the transport belt 13, it is possible to expose a larger portion of the fruit to a sorting device for sorting based on color, size, or other parameters. In addition, as a result of the gradual divergence of belt portions 13*a* and 13*b*, it is possible to lower the fruit or other items to be sorted into carrier cups 21 without experiencing undue shock. This is because the transport belt 13 travels directly over the carrier cups and moves at the same rate of speed. As the fruit is gradually lowered, rather than dropped into the carrier cup, it does not experience the rough handling resulting from dropping over a long vertical distance. In addition, since the fruit is travelling at the same rate as the carrier cup in the linear X direction, the rear portion of the cup does not impact the fruit to create further bruises.

As previously discussed, the undulating wave shaped belt 17 is used to provide stabilization of items to be sorted. This belt could be eliminated if the items to be sorted are such that stabilization would not be required. For example, if the items to be sorted were of such a shape and dimension as to be carried by the transport belt 13 without prior stabilization, it would not be necessary to include the wave shaped belt 17. Another approach to eliminating the wave shaped belt is to employ stabilizing protrusions on the transport belt 13 itself. However, this may create disadvantages in that the protrusions on the belt could make it difficult to twist the belt as it exits guides 55 and is twisted around idle pulleys 57.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. An apparatus for transferring items comprising:

a singulator for organizing the items into at least one serial stream;

a moveable transport belt for each serial stream, the transport belt having first and second portions spaced apart a distance for receiving and carrying the items from the serial streams, the first and second portions of the transport belts gradually diverging to slowly lower the items into moveable carriers, wherein the singulator comprises an undulating shape belt situated between the first and second portions of each transport belt.

2. The apparatus recited in claim 1 wherein the undulating shaped belt has a length selected to stabilize the items on the transport belt.

3. The apparatus recited in claim 1 further comprising at least one divider shaped to separate the items into at least two serial streams.

4. A method of transferring items, the method comprising the steps of:

organizing the items into at least one serial stream;

placing the items in each serial stream on a moveable transport belt having first and second portions spaced apart a distance for receiving and carrying the items from the serial streams; and gradually diverging the first and second portions of the transport belts to slowly lower the items into moveable carriers; and placing the items to be transferred on an undulating shaped belt located between the first and second portions of each transport belt.

5. The method recited in claim 4 further comprising selecting a length of the undulating belt to stabilize the items to be placed on the transport belt.

* * * * *